Aug. 27, 1946.   C. E. LUCKE   2,406,551
CYLINDER COOLING STRUCTURE FOR AIRCRAFT ENGINES
Filed Aug. 28, 1943   2 Sheets-Sheet 1
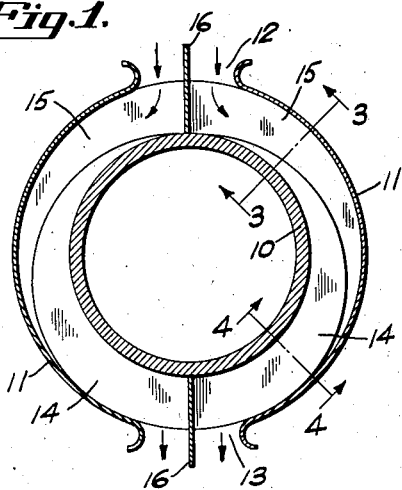
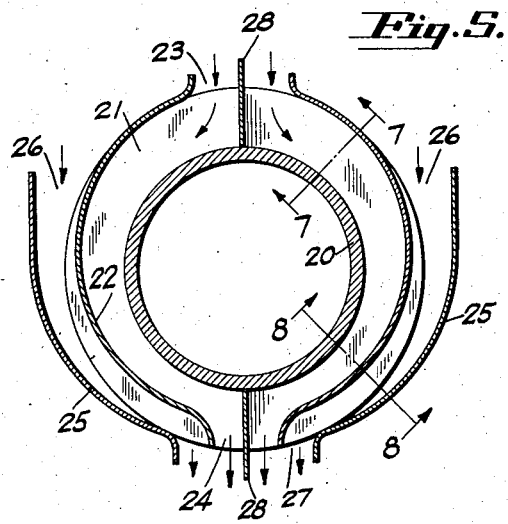
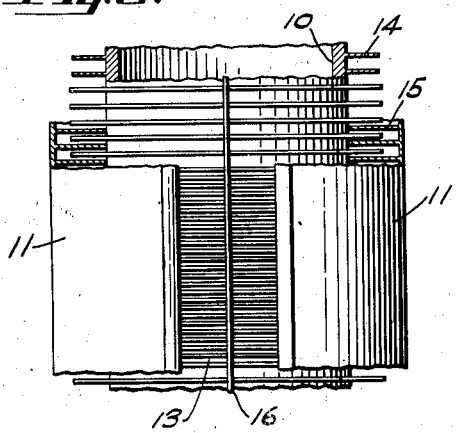
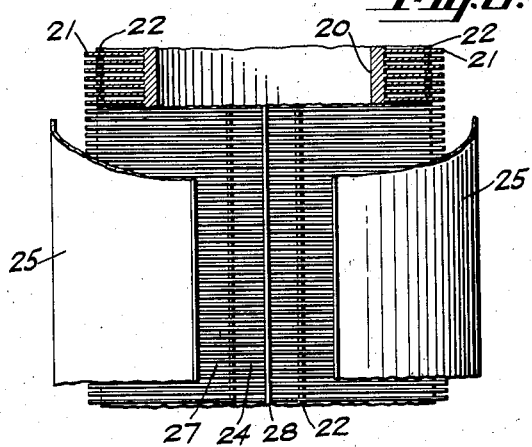
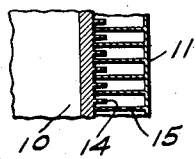
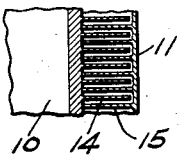
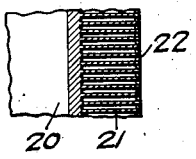
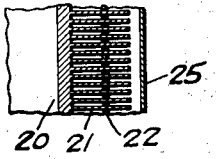
INVENTOR
Charles E. Lucke.
BY Charles L. Shelton
ATTORNEY Aug. 27, 1946.   C. E. LUCKE   2,406,551
CYLINDER COOLING STRUCTURE FOR AIRCRAFT ENGINES
Filed Aug. 28, 1943   2 Sheets-Sheet 2
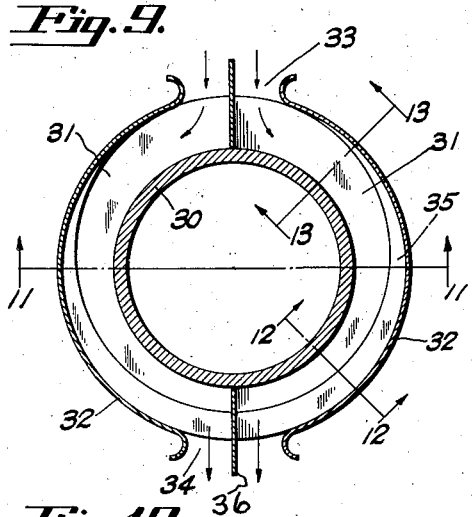
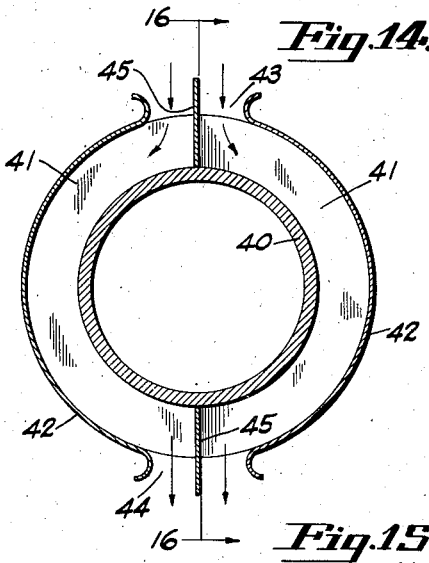
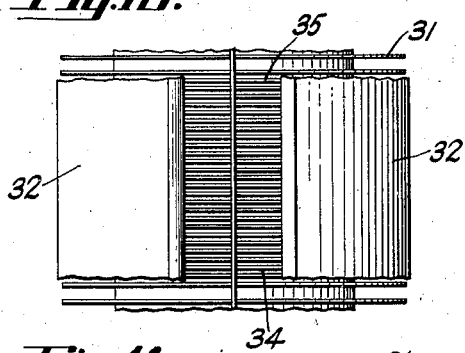
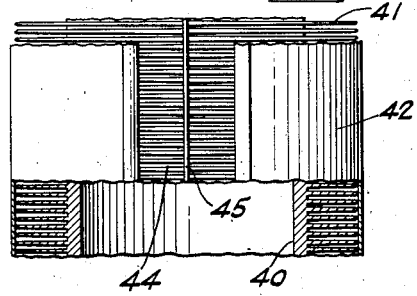
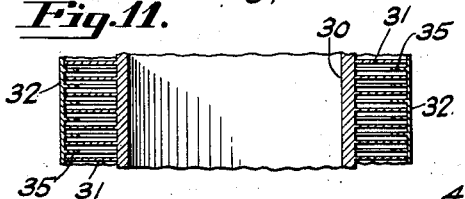
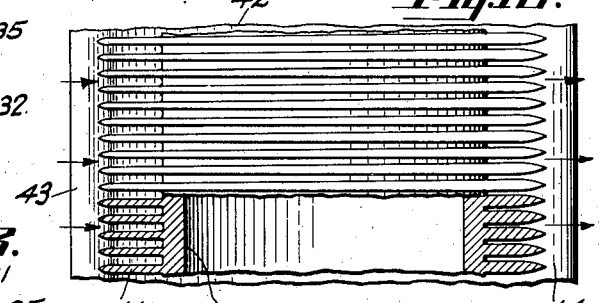
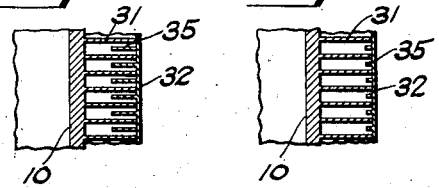
INVENTOR
Charles E. Lucke.
BY Charles L. Shelton
ATTORNEY Patented Aug. 27, 1946

2,406,551

UNITED STATES PATENT OFFICE 2,406,551

CYLINDER COOLING STRUCTURE FOR AIRCRAFT ENGINES

Charles E. Lucke, New York, N. Y., assignor to United Aircraft Corporation, East Hartford, Conn., a corporation of Delaware Application August 28, 1943, Serial No. 500,334

16 Claims. (Cl. 123—171)

This invention relates to air-cooled aircraft engines and particularly to improved and efficient cooling means for the engine cylinders so that the walls thereof may be uniformly cooled circumferentially.

A primary object of the present invention is to provide improved air cooling means for internal combustion engine cylinders of the aircraft type in which the cooling air is constrained to flow transversely about the cylinders, the constraining means causing the air to closely follow the circumference of the cylinders to equalize the cooling effect of the air upon their down stream sides, with that on the up stream side in spite of the higher air temperature on the down stream side.

A feature of the invention that is desirable is that the enclosing means for constraining the air at its admitting portion has a relatively large air flow area adjacent the air intake which is gradually reduced through the air duct to cause an increase in the product of density and velocity of the air as it passes around a cylinder and finally is exhausted from the down stream side thereof. The product of density and velocity is referred to as mass flow throughout the specification.

Another feature of the invention that is important is that the cooling of the portion of the cylinder surface extensions exposed to the rush of air is equalized between up and down stream sides by increasing the area of metal exposed to the cooling air on the down stream side and by increasing the amount of air to pass over these down stream areas.

Another object of the invention is to provide simple forms of air cooling means particularly designed for aircraft engine cylinders and effecting substantially maximum uniform cooling circumferentially of the cylinder walls.

And finally it is another primary object of the invention to provide an extended surface fin or equivalent structure surrounding an aircraft engine cylinder and enclosed within a cowl or jacket, this structure effecting maximum uniformity in cooling the walls circumferentially of the cylinder.

Other objects and advantages will be apparent from the specification and claims and from the drawings which illustrate what are now considered to be preferred embodiments of the invention.

In the drawings,

Fig. 1 is a transverse sectional view of an aircraft engine cylinder provided with one form of the present invention.

Fig. 2 is a side elevation, partly in section, of the cylinder shown in Fig. 1.

Figs. 3 and 4 are fragmentary sectional views taken respectively on the planes of lines 3—3 and 4—4 of Fig. 1.

Fig. 5 is a view similar to Fig. 1, showing another form of the invention.

Fig. 6 is a side elevation, partly in section, of the form of the invention shown in Fig. 5.

Figs. 7 and 8 are fragmentary sectional views taken respectively on the planes of lines 7—7 and 8—8 of Fig. 5.

Fig. 9 is a transverse sectional view of a cylinder similar to Fig. 1 but showing a still further form of the invention.

Fig. 10 is a partial side elevation of the cylinder shown in Fig. 9, parts being broken away to more clearly show the cooling fins.

Fig. 11 is a vertical sectional view taken on the plane of line 11—11 of Fig. 9.

Figs. 12 and 13 are fragmentary sectional views taken respectively on the planes of lines 12—12 and 13—13 in Fig. 9.

Fig. 14 is a transverse sectional view of a cylinder similar to Fig. 1 but showing a still further form of the invention.

Fig. 15 is a side elevation, partly in section, of the cylinder shown in Fig. 14; and, Fig. 16 is a side elevation partly in section of the cylinder shown in Fig. 14 and taken on the plane of line 16—16 in Fig. 14; this view showing the varying thickness circumferentially of the fins about the cylinder.

In the standard forms of air-cooled aircraft engine cylinders cooling on the upstream side greatly exceeds that on the downstream side. The temperature difference between the opposite sides of a cylinder caused by this uneven cooling may be great enough to cause a distortion from the circular to an ovate section and impair the action of the piston contact with the walls and its lubrication. The present invention equalizes the amount of cooling on the upstream side and on the downstream side of the cylinder, the result being that the cylinder walls are substantially uniformly cooled about their entire circumference and it remains circular. An increased cooling on the downstream side is effected by constraining the air admitted at the intake to the inter-fin spaces to flow transversely completely about the downstream side of the cylinder, also this cooling is increased by increasing the fin area and amount of metal in the fins on the downstream side of the cylinder and by gradually increasing the air mass flow as it passes through the air duct.

In its preferred forms the invention may include the following principal parts: First, a cylinder having a plurality of thin circumferential radially extending fins; second, substantially semi-circular jacket or cowl members enclosing portions of said fins and providing openings for the intake and exhaust of cooling air to and from the air duct or inter-fin spaces within the jacket; third, supplemental fins within the air duct distributed principally about the downstream portion of the cylinder; and fourth, fins supported on or formed integrally with the jacket members and extending into the air duct.

Referring more in detail to the figures of the drawings and first to the form of invention shown in Figs. 1 to 4, it will be seen that the cylinder 10 is provided with a jacket surrounding and partially enclosing the cylinder. The jacket as will be seen in Figs. 1 and 2 is formed of two symmetrical substantially semi-cylindrical members 11 each partially surrounding the cylinder 10 at a uniform distance therefrom, there being openings 12 and 13 formed between the ends of these jacket members 11 for the intake and exhaust respectively of air passing between the jacket and cylinder walls.

Circumferential fins 14 are provided on the outside surface of the cylinder 10 integrally formed thereon or welded or brazed thereto so that they are thermally united thereto. As shown in Fig. 1 these fins are shorter adjacent the air admitting end 12 and are of gradually increasing radial length about the cylinder 10 and toward the exhaust opening 13.

As shown most clearly in Fig. 1 the outstanding fins 14 on the cylinder 10 are entirely cut away at the intake side 12 of the cylinder and extend the full distance between the cylinder 10 and jacket members 11 at the exhaust side 13 of the cylinder, the length of the fins 14 gradually increasing from the intake to the exhaust side as more clearly shown in the sections, Figs. 3 and 4. Therefore, the area and mass of the air-swept metal fins 14 gradually increase along the air duct and as the temperature of the cooling air passing the fins increases.

Extending radially inwardly from the jacket members 11 are circumferential fins 15 preferably and as shown in Figs. 1 to 4 extending the entire distance between the cylinder wall and jacket and completely encircling the cylinder. These fins 15 may be thermally united to the jacket members 11 by being welded or brazed thereto and enter the spaces between adjacent fins 14 extending outwardly from the cylinder 10. Fins 15 may contact or may be brazed to the cylinder wall 10 at their inner periphery.

The inter-fin spaces are divided centrally in the direction of flow of the cooling air by axially extending diaphragms 16, one inserted centrally of the intake opening 12 and another inserted centrally of the exhaust opening 13. By means of these diaphragms 16 the stream of air is centrally divided as it enters the up stream end inter-fin spaces.

The form of invention shown in Figs. 5 to 8 has its cylinder 20 provided with uniformly spaced circumferential fins 21 of equal radial length throughout its circumference. Interposed between adjacent fins 21 are arcuate strips 22 united along their upper and lower edges to opposite surfaces of adjacent fins 21 and collectively forming jacket members generally similar to those shown in Figs. 1 to 4. As indicated most clearly in Fig. 5 these arcuate members 22 near the air intake portion 23 are at the outer ends of the radially outstanding fins 21 and, as these members 22 extend circumferentialy toward the exhaust portion 24 they contact intermediate portions of the fins 21 and at the exhaust portion 24 substantially one half of the fins 21 are outside the jacket formed by these members, the remaining portions being within these jacket members. To induce air to pass between the outer portion of the fins 21 additional substantially semi-cylindrical eccentric jacket members 25 are provided. Intakes for these supplemental jacket members 26 may be extended laterally beyond the circumferential fins 21 to admit maximum air to the space between the outer ends of the fins 21 beyond the jacket portions 22. The exhaust openings 27 for the spaces between the jacket members 22 and the supplemental members 25, as shown in Fig. 5 may be adjacent and on opposite sides of the main exhaust opening 24. Diaphragms 28 may be utilized as in the previously described form of the invention to divide the stream of air as it enters the air duct.

The form of the invention shown in Figs. 9 to 13 has its cylinder 30 provided with uniformly spaced fins 31 of uniform radial length throughout the circumference. Surrounding these fins 31 and thermally united thereto at their outer ends are arcuate jacket members 32. Intake and exhaust openings 33 and 34 are provided as in the other forms of the invention previously described. Extending inwardly from the inner surface of the jacket members 32 are fins 35 of varying radial length or height. Adjacent the intake portion 33 they are of but slight extent and their length increases symmetrically on opposite sides toward the exhaust opening 34. As seen in Figs. 9 and 10 these inwardly extending fins 35 are continuous across the exhaust opening between the two cowl members 32 up to the diaphragm 36.

In Figs. 14 to 16 is shown a form of the invention in which a series of uniformly spaced fins 41 having uniform radial height extend circumferentially about the cylinder 40 to which they may be thermally united. Surrounding these fins 41 are arcuate jacket members 42 as in the previously described forms of the invention. As shown in Fig. 16 the fins 41 are of increasing thickness circumferentially of the cylinder from the intake portion 43 to the exhaust portion 44 so that the spaces between the fins for the air adjacent the intake are relatively wide and adjacent the exhaust are relatively narrow. Thus, the mass flow of the air passing through the air duct increases uniformly from intake to exhaust, also the amount of metal in contact with the cooling air increases during the passage of the air through the air duct. Diaphragms 45 are similar to those previously described and may be inserted in the intake and exhaust openings 43 and 44.

In each of the above described forms of the invention there is a relatively open space within the jacket members and between the fins adjacent the air intake on the upstream side of the cylinder, this open space gradually decreasing around the cylinder in both directions toward the exhaust opening at the downstream side of the cylinder. By reason of this reduction within the inter-fin space for the cooling air the mass flow of the air as it passes through the inter-fin space uniformly increases. Less fin surface area is exposed to the cooling air at and adjacent the intake where the air is coolest but this area and the amount of heat conducting metal in the fins is materially increased gradually and uniformly as the air passes through the inter-fin spaced toward the exhaust. At the exhaust end and portions adjacent thereto, the fin area and metal of the fins is at a maximum. Also the mass flow of air as it passes through the inter-fin spaces gradually increases.

It is to be understood that the invention is not limited to the specific embodiments herein illustrated and described, but may be used in other ways without departure from the spirit of the invention as defined by the following claims.

I claim:

1. In a cooling arrangement for internal combustion engine cylinders, the combination with a cylinder barrel, of a plurality of annular cooling fins comprising two groups surrounding said barrel, cowl members partially surrounding said fins and providing intake and exhaust openings for the cooling air, one of said groups of fins extending from the cylinder wall to said cowl throughout their circumferences, and the second group being reduced in radial length throughout a portion of their circumferences, contacting surfaces of said fins and cowl members being thermally united, said second group of fins increasing in area toward said cooling air exhaust opening.

2. In a cooling arrangement for internal combustion engine cylinders, the combination with a cylinder barrel of a plurality of annular cooling fins surrounding said barrel and thermally united thereto, cowl members partially surrounding said fins and providing intake and exhaust openings for said inter-fin spaces, and a plurality of annular fins thermally united to said cowl members and extending into said inter-fin spaces, the area of said fins thermally united to said cowl members gradually increasing in area toward the cooling air exhaust opening.

3. In a cooling arrangement for internal combustion engine cylinders, the combination with a cylinder barrel of a plurality of annular cooling fins surrounding said barrel and thermally united thereto, cowl members partially surrounding said fins and providing intake and exhaust openings for the inter-fin spaces, some of said fins being reduced in radial length, whereby the free space between the fins adjacent the intake opening is greater than adjacent the exhaust opening, the area of said fins gradually increasing and the interfin space decreasing toward the exhaust opening.

4. Temperature equalizing means for engine cylinder barrels comprising a plurality of closely adjacent circumferential heat radiating fins thermally united to the barrel, means for confining the air flow to the inter-fin spaces, and means to increase the mass velocity of the air during its course through the inter-fin spaces, said fins gradually increasing in area and said interfin air spaces decreasing during the course of the cooling air through said space.

5. Temperature equalizing means for engine cylinder barrels comprising a plurality of closely adjacent circumferential heat radiating fins thermally united to the external surface of the barrel, cowl members partially surrounding the barrel for confining the air flow to the inter-fin spaces, and means to increase the mass velocity of the air during its course through the inter-fin spaces, said fins gradually increasing in area and said interfin air spaces decreasing during the course of the cooling air through said space.

6. Temperature equalizing means for engine cylinder barrels comprising a plurality of closely adjacent circumferential heat radiating fins thermally united to the barrel, cowl members partially surrounding the barrel for confining the air flow to the inter-fin spaces, and annular fins thermally united to said cowl members extending within the sapce between the barrel and the cowl members, the area of said fins increasing gradually in the direction of airflow.

7. In a cooling arrangement for internal combustion engine cylinders, the combination with a cylinder barrel of a plurality of annular cooling fins surrounding said barrel, cowl members partially surrounding said fins and thermally united thereto, said cowl members providing diametrically opposite openings for the intake and exhaust of air to and from said inter-fin spaces, and fins provided on said cowl members, the amount of fin metal exposed to the cooling air increasing within the inter-fin spaces in the direction of the flow of air therethrough.

8. In a cooling arrangement for internal combustion engine cylinders, the combination of a cylinder barrel, of a plurality of annular cooling fins surrounding said barrel and thermally united thereto, cowl members partially surrounding said fins and providing intake and exhaust openings for the inter-fin spaces, some of said fins being thermally united to said barrel and cowl and other fins being united to one only of said members, whereby the free space between the fins adjacent the intake opening is greater than adjacent the exhaust opening and the area of said fins gradually increases toward the exhaust opening.

9. In a cooling arrangement for internal combustion engine cylinders, the combination with a cylinder barrel, of a plurality of annular cooling fins surrounding said barrel and thermally united thereto, built-up cowl members disposed between adjacent fins at variable distances along their length whereby portions of said fins extend radially beyond said cowl members, said cowl members forming intake and exhaust openings on opposite sides of said barrel, and supplemental cowl members surrounding and enclosing the extended portions of said fins.

10. In an air cooled internal combustion engine cylinder in which the cooling air flows tranversely across and around said cylinder, the combination of externally extended thermally integral metal members in the path of the cooling air, a jacket having inlet and outlet openings and enclosing the air stream, and means for equalizing the temperature of the cylinder wall circumferentially thereof, said means comprising a circumferentially decreasing air flow area between said inlet and outlet openings.

11. In an air cooled internal combustion engine cylinder in which the cooling air flows transversely across and around said cylinder, the combination of externally extended thermally integral metal members in the path of the cooling air, a jacket having inlet and outlet openings and enclosing the air stream, and means for equalizing the temperature of the cylinder walls circumferentially thereof, said means comprising a circumferentially increasing metal surface swept by the air between said inlet and outlet openings said metal surface increasing in area toward said outlet opening, and said metal surface receiving heat by conduction from said cylinder.

12. In an air cooled internal combustion engine cylinder in which the cooling air flows transversely across and around said cylinder, the combination of externally extended thermally integral metal members in the path of the cooling air, a jacket having inlet and outlet openings and enclosing the air stream, and means for equalizing the temperature of the cylinder walls circumferentially thereof, said means comprising a gradually and circumferentially increasing cross section of metal in the direction of the outlet opening conducting heat from the cylinder to the air swept surface.

13. In an air cooled internal combustion engine cylinder in which the cooling air flows transversely across and around said cylinder, the combination of externally extended thermally integral metal members in the path of the cooling air, a jacket having inlet and outlet openings and enclosing the air stream, and means for equalizing the temperature of the cylinder walls circumferentially thereof, said means comprising a circumferentially decreasing air flow area between said inlet and outlet openings, and a circumferentially increasing metal surface swept by the air between said inlet and outlet openings, said metal surfaces receiving heat by conduction from the cylinder.

14. In an air cooled internal combustion engine cylinder in which the cooling air flows transversely across and around said cylinder, the combination of externally extended thermally integral metal members in the path of the cooling air, a jacket having inlet and outlet openings and enclosing the air stream, and means for equalizing the temperature of the cylinder walls circumferentially thereof, said means comprising a circumferentially decreasing air flow area between said inlet and outlet openings, and a circumferentially increasing cross section of metal conducting heat from the cylinder to the air swept surface.

15. In an air cooled internal combustion engine cylinder in which the cooling air flows transversely across and around said cylinder, the combination of externally extended thermally integral metal members in the path of the cooling air, a jacket having inlet and outlet openings and enclosing the air stream, and means for equalizing the temperature of the cylinder walls circumferentially thereof, means comprising a circumferentially increasing metal surface swept by the air between said inlet and outlet openings, said metal surface receiving heat by conduction from said cylinder, and a circumferentially increasing cross section of metal conducting heat from the cylinder to the air swept surface.

16. In an air cooled internal combustion engine cylinder in which the cooling air flows transversely across and around said cylinder, the combination of externally extended thermally integral metal members in the path of the cooling air, a jacket having inlet and outlet openings and enclosing the air stream, and means for equalizing the temperature of the cylinder walls circumferentially thereof, said means comprising a circumferentially decreasing air flow area between said inlet and outlet openings, circumferentially increasing metal surfaces swept by the air between said inlet and outlet openings whereby said metal surfaces may receive heat from conduction from said cylinder, and a circumferentially increasing cross section of metal conducting heat from the cylinder to said air swept air surface.

CHARLES E. LUCKE.